UNITED STATES PATENT OFFICE.

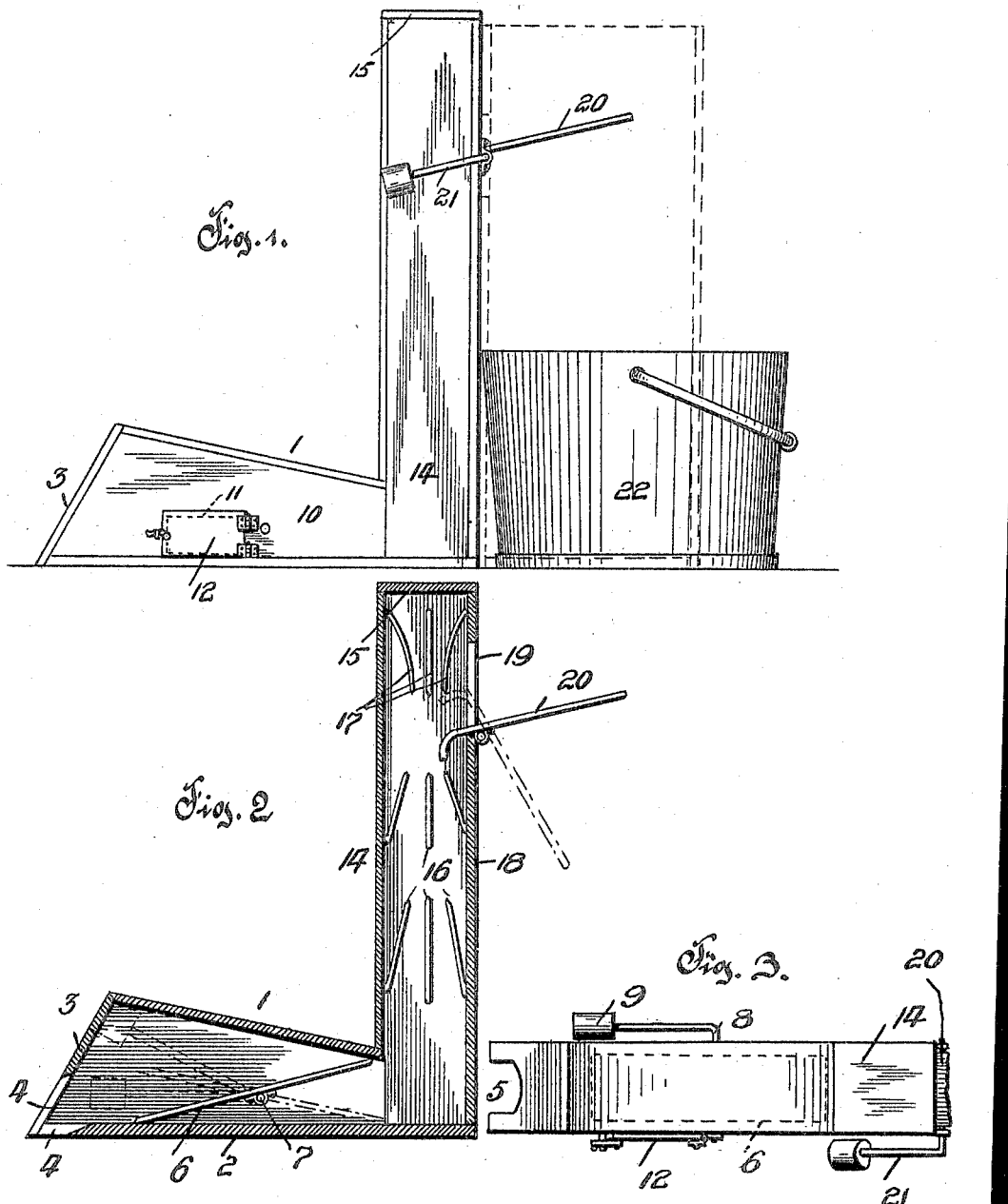

FRANK KLOUSNITZER, OF HERMAN, PENNSYLVANIA, ASSIGNOR OF ONE-HALF TO HENRY CYPHER, OF MARWOOD, PENNSYLVANIA.

RAT-TRAP.

No. 821,366.  Specification of Letters Patent.  Patented May 22, 1906.

Application filed February 6, 1906. Serial No. 299,726.

*To all whom it may concern:*

Be it known that I, FRANK KLOUSNITZER, a citizen of the United States of America, residing at Herman, in the county of Butler and State of Pennsylvania, have invented certain new and useful Improvements in Rat-Traps, of which the following is a specification, reference being had therein to the accompanying drawings.

This invention relates to certain new and useful improvements in rat-traps; and the invention has for its object to provide a novel form of trap wherein novel means is provided for drowning a rat after it has entered the trap. To this end I have constructed a novel form of trap having a compartment in which a rat or the like animal is entrapped, the exit of the compartment being constructed whereby the rat or animal contained therein will be precipitated into a pail or tank of water upon leaving the compartment.

The entire trap is constructed to represent a fixture of a room or compartment and is provided with an entrance adapted to attract the attention of a rat or animal without arousing the suspicions of an animal entering the trap.

The rat-trap is adapted to dispense with the trouble heretofore experienced in killing the animals after they have been caught. I having devised novel means in connection with the trap for exterminating the animals after they have been entrapped and should they try to escape.

The invention is also applicable to vermin, such as large insects, and also may be constructed upon a larger scale to entrap wild animals.

With the above and other objects in view, which will more readily appear as the nature of the invention is better understood, the same consists in the novel construction, combination, and arrangement of parts to be hereinafter more fully described and claimed, and referring to the drawings accompanying this application like numerals of reference designate corresponding parts throughout the several views, in which—

Figure 1 is a side elevation of my improved trap. Fig. 2 is a vertical sectional view, and Fig. 3 is a plan.

To put my invention into practice, I construct my improved trap of a tapering casing 1, consisting of a base 2, and a slanting front board 3, the lower edge of said board, together with the end of the base 2, being cut away, as at 4, 4 forming an opening 5, through which an animal passes. In the casing 1 is fulcrumed a platform 6, said platform being mounted upon a rod 7, journaled transversely of the casing and having its outer end bent, as at 8, and provided with a weight 9 to normally hold the platform 6 in the position shown in Fig. 2 of the drawings. The one side wall 10 of the casing is provided with an opening 11, which is normally closed by a hinged door 12. The opening 11 permits of easy access being had to the interior of the casing to place bait, such as cheese or raw meat, beneath the lower end of the platform 6.

Upon the base 2 at the smaller end of the casing 1 is mounted a vertical shaft 14, having a closed upper end 15. In the lower portion of the shaft is arranged a plurality of inwardly and upwardly extending sharpened prongs 16, which are adapted to assist the animal in climbing upwardly within the shaft, but prevent the animal from descending after having once passed the prongs. The extreme upper end of the shaft is also provided with depending prongs 17, which prevent an animal from lodging in the upper end of the shaft. The rear wall 18 of the shaft is provided with an opening 19, and at the bottom of said opening is pivotally mounted an ejector-plate 20, the greater portion of which extends outwardly from the shaft, but is normally held in the position shown in Figs. 1 and 2 of the drawings by the curved weighted shaft 21, upon which the ejector-plate is mounted.

In conjunction with the trap just described I use a tank or pail of water 22, which is placed directly beneath the ejector-plate 20, whereby when the animal passes upon said plate its own weight will tilt the plate and precipitate the animal into the water or liquid contained within the tank or pail 22.

The dark compartment formed in the casing 1, together with the scent of the bait beneath the platform 6, is adapted to attract a rat or animal thereto, and the minute the animal passes upon the innermost end of the platform 6 the weight of the rat or animal tilts the platform, permitting the rat or animal to enter the shaft 14, at which time the platform recedes to its normal position preventing the rat from passing outside of the casing 1. The light which is reflected through the opening 19 at the upper end of the shaft notifies the rat or animal of an exit by which the animal attempts to escape, and upon climbing the shaft 14 and passing upon the plate 20 the tilting of said plate ejects the animal, causing it to fall into the tank or pail of water or liquid placed beneath the outer end of said plate. It will thus be seen that quite a number of animals may be entrapped without changing the bait or removing the animals from the trap, for as fast as they are entrapped they are exterminated.

I preferably construct my improved trap of wood, and the simplicity of construction employed permits of the trap being manufactured at a comparatively small cost.

It will be noted that various changes may be made without departing from the spirit and scope of the invention.

What I claim, and desire to secure by Letters Patent, is—

A trap embodying a casing having an opening formed therein, a tilting platform mounted within said casing, a closed shaft communicating with said casing and having an opening formed near its upper end, an ejector-plate pivotally mounted in said opening, a plurality of upwardly-projecting stationary prongs arranged within said shaft below the ejector-plate, downwardly-projecting prongs arranged above the ejector-plate, means to maintain said tilting platform in its normal position, and means to retain said ejector-plate in an elevated position, substantially as described.

In testimony whereof I affix my signature in the presence of two witnesses.

FRANK KLOUSNITZER.

Witnesses:
    H. C. EVERT,
    L. F. TOMASZESKI.